Figure 1:
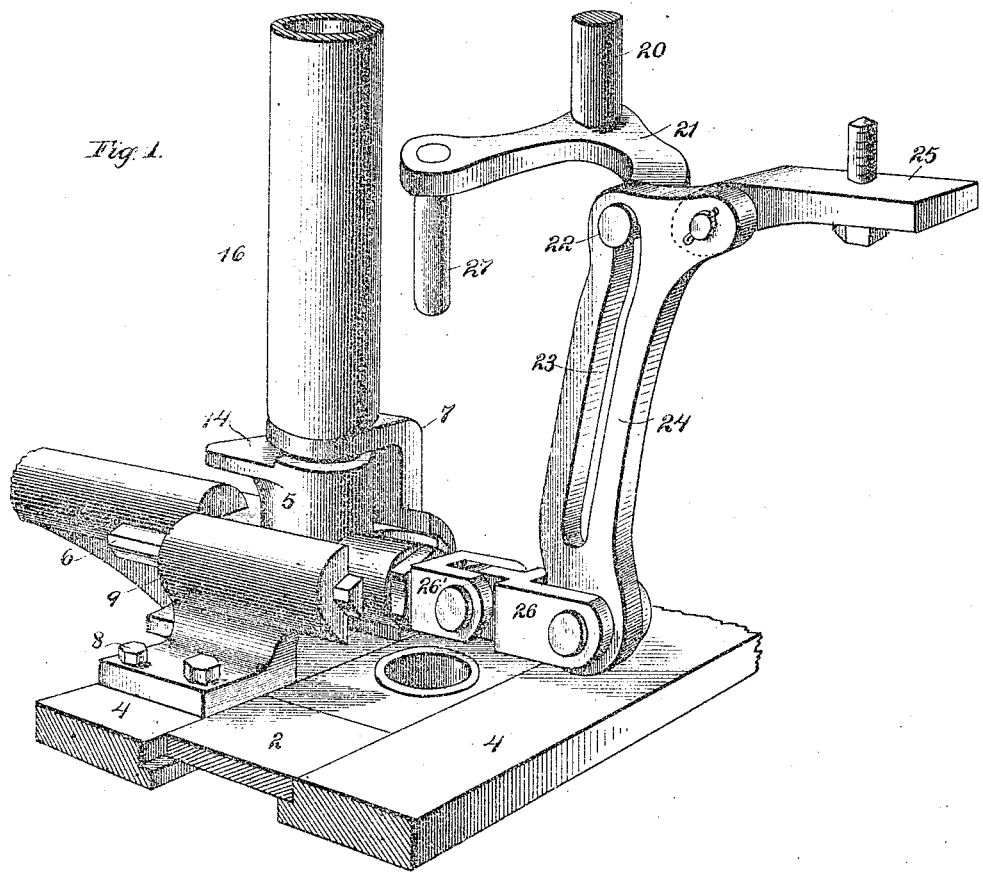
Figure 1A:
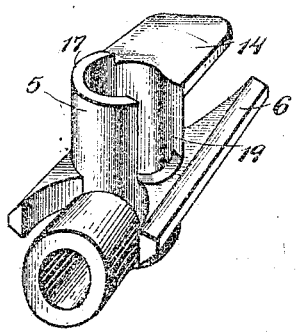

(No Model.)  2 Sheets—Sheet 1.
C. S. HISEY.
SHELL PLACER.

No. 495,888. Patented Apr. 18, 1893.

WITNESSES.
Victor J. Evans.
L. M. Marble.

INVENTOR.
C. S. Hisey.
By E. M. Marble
Attorney.

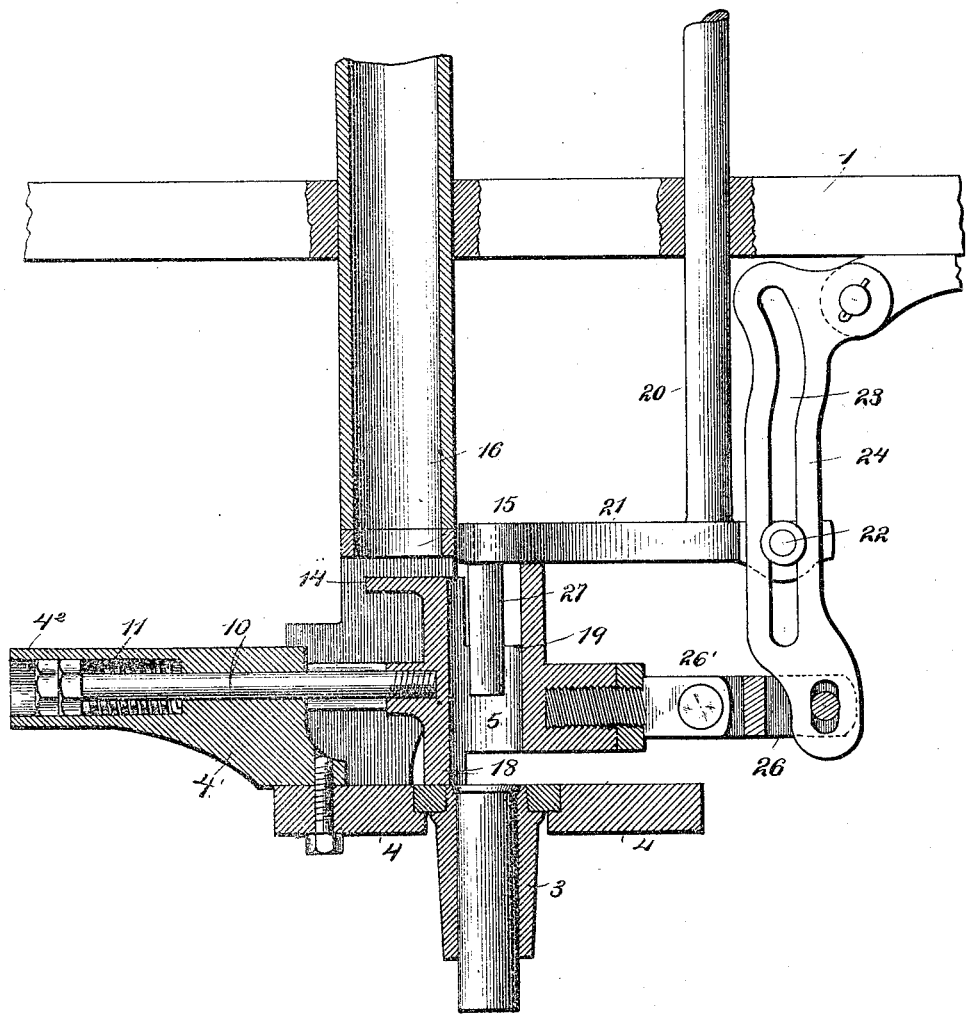

UNITED STATES PATENT OFFICE.

CHARLES S. HISEY, OF AURORA, INDIANA, ASSIGNOR TO ELLIOTT S. RICE, OF CHICAGO, ILLINOIS.

SHELL-PLACER.

SPECIFICATION forming part of Letters Patent No. 495,888, dated April 18, 1893.

Application filed September 26, 1892. Serial No. 446,959. (No model.)

*To all whom it may concern:*

Be it known that I, CHARLES S. HISEY, a citizen of the United States, residing at Aurora, in the county of Dearborn and State of Indiana, have invented certain new and useful Improvements in Shell-Placers; and I do hereby declare the following to be a full, clear, and exact description of the invention, such as will enable others skilled in the art to which it appertains to make and use the same.

My invention relates to improvements in shell-placers for cartridge loading machines, and it consists in the construction and arrangement of the parts which will be hereinafter fully described, and particularly pointed out in the claims.

In cartridge loading machines in which the empty cartridge shells are successively brought under the loading tools of the machine to be filled with powder, wads, and shot, and finally to be ejected from the machine as finished cartridges, whether they are carried in shell cases secured to or in an endless belt, as represented in my application for Letters Patent for improvements in cartridge loading machines filed June 24, 1889, and also of even date herewith, or carried in the cells or apertures of a rotating shell carrier, as represented in United States Letters Patent No. 480,015, granted to me August 2, 1892, or otherwise, it is necessary that the empty cartridge shells shall be fed with entire certainty and uniformity into the shell cases of the shell carrier, so that the cartridge loading tools may operate successively and continuously thereon.

The object of my invention is to produce a shell-placer which shall perform its function with perfect uniformity and precision, which shall be simple in construction, easily adjusted in position on the cartridge loading machine, and comparatively cheap to manufacture. This object I attain by the use of the mechanism illustrated in the drawings accompanying and forming a part of this application, in which the same reference numerals refer to the same or similar parts, and in which:

Figure 1 is a perspective view of the shell placer. Fig. 1ª is a detail perspective view of the shell receiver. Fig. 2 is a vertical section of the shell placer, the parts being shown in the position they assume immediately after the delivery of a cartridge shell into one of the shell cases of the endless belt.

In the drawings I have represented my shell placer as applied to a cartridge loading machine of the kind illustrated and described in my application for Letters Patent for improvements in cartridge loading machines filed of even date herewith, in which the shell carrier is in the form of an endless belt, to the links of which are attached projecting shell cases, which are carried with an intermittent movement under the various loading tools of the machine, the endless belt being mounted on and rotated by prismatic disks, journaled at each end of a stationary table, on which are placed in a straight line the loading devices. In this machine the empty cartridge shells are fed into the shell cases of the endless belt as the belt passes under the table, and indeed in such a manner that at each intermittent movement of the belt, a cartridge shell is fed into one of the shell cases.

In the drawings, 1 represents a portion of the stationary table and 2 a portion of the endless belt, into each link of which is screwed a hollow shell case 3, which is of such size as to permit the end of the cartridge shell, when placed in the case, to rest flush with the inner surface of the endless belt.

At the point where the placing of the empty cartridge shells into the shell cases is to be effected, the endless belt is received and guided between the grooved metal guides 4, which are retained in their proper position under the stationary table by bolts running through the same, and which, besides preventing any deviation of the endless belt as it passes this point, serve to support the shell placer.

The shell placer is provided with the shell receiver 5, which in its operation is reciprocated over the endless belt, and which is held in a position at right angles to the direction of travel of the endless belt by the V-shaped slides 6, preferably cast integral with it, which slide in correspondingly formed grooves 9 in the guides 7, which are attached to the upper surface of one of the guides 4 by the bolts 8. The guides 7 are wide enough, and the V-shaped slides 6 are long enough to offer a steady bearing to the shell receiver in its reciprocations, and to insure the perfectly uniform movement of the same. One of the guides 7 is extended upward and bent over the shell receiver, and the surface thus formed offers a support for the supply-tube 16, by which the cartridge shells are supplied, an opening 15 in said support registering with the end of said tube, and permitting the descent of the cartridge shells into the shell receiver.

To the guides 4, supporting the shell receiver, is secured a bracket 4' carrying a tube or raceway 4² for the reciprocation of the screw-threaded bolt 10, to the outer end of which is secured one end of the spiral spring 11 whose other end is fastened as shown to said bracket 4'.

The shell receiver is provided at its upper end with the lip or flange 14, which covers the opening 15 when the shell receiver is moved forward over the endless belt, and prevents the descent of any other cartridges, and the consequent clogging of the shell placer. It is also provided with the ledge 17, which serves to prevent the shell, falling into the shell receiver, from catching on the upper edge of the same, and with the downwardly extending flange 18 on its lower surface, which extends downward to a level with the surface of the bracket 4 and prevents the cartridge from being caught in any way, as in the operation of the shell placer the shell receiver is moved forward to deposit a shell in the shell case, and with the opening 19, which extends down one side of the shell receiver in the form of a slot, and which is for the purpose of permitting the removal of a shell from the shell receiver should it, by any chance, have been caught or jammed in its descent into position in the shell case. The inner surfaces of the shell receiver and of the various flanges and ledges belonging to the same are somewhat concaved to aid the empty cartridge shells as they are delivered from the tube 16 in slipping into place in the shell receiver.

The operative mechanism of the shell placer consists of the rod or shaft 20, secured to and reciprocated by the cross-head, and provided at its lower end with the bent arm 21, on one end of which is the stud 22, which works in the cam slot 23 of the pivoted lever 24, attached at one end to the table 1 by the bracket 25, and at its other end to the shell receiver 5 by the link 26 and clevis 26'. On the other end of the said bent arm 21 is the punch 27.

The operation of the shell placer is as follows: When the rod or shaft 20 descends, it forces, by means of the stud 22 working in the cam slot 23 of the lever 24, the shell receiver carrying an empty shell over the endless belt, whose movement is so regulated that at the instant said rod 20 reaches its lowest movement, it is stationary and has an empty shell case in readiness to receive a cartridge shell. The cartridge shell, which has fallen into the shell receiver from the tube 16, falls at once into the shell case, its prompt descent being insured by the punch 27, which descends sufficiently far to strike the cartridge shell and force it into the shell case. While the shell receiver is moved over the endless belt, the ledge or flange 14 covers the opening 15, and prevents another shell from falling from said tube until the shell receiver is again in place. The movement of the shell receiver over the endless belt puts the spring 11 in tension, and when the rod 20 begins to rise, this spring constantly tends to draw the shell receiver back into its normal position again. This action cannot take place, however, while the stud 22 is working in the straight portion of the cam slot 23. As soon as the curved portion of this slot is reached, the punch 27 being at this time entirely withdrawn from the shell receiver, the shell receiver is pulled into position under the opening 15 by the spring 11, this action being due to the spring, rather than to the stud 22 working in the cam groove 23, because the spring acts before the stud acts, by reason of its being in tension. This operation is repeated at each descent and ascent of the rod 20, which may take place with any desired rapidity, as very little time is required for the cartridge shells to fall into place in the shell receiver, and be forced into the shell cases.

Having thus fully described my invention, what I claim as new, and desire to secure by Letters Patent, is—

1. In a shell-placer for cartridge loading machines, the combination with the shell feeding device, of a reciprocating shell receiver for receiving shells and delivering the same into the shell cases of a shell carrier, mechanism for moving said shell receiver from the shell delivery device to the shell carrier, and a spring attached to said shell receiver for returning the same to its first position, substantially as described.

2. In a shell-placer for cartridge loading machines, the combination with the shell-feeding device, of a reciprocating shell-receiver for receiving shells and delivering the same into the shell cases of a shell carrier, mechanism driven by the reciprocating cross-head of the machine for moving said shell receiver from the shell delivery device to the shell carrier, and a spring attached to said shell receiver for returning the same to its first position, substantially as described.

3. In a shell-placer for cartridge loading machines, the combination with the shell feeding tube or device, of a reciprocating shell-receiver movable in fixed guides for receiving shells and delivering the same into the shell cases of a shell carrier, and provided with a lip or flange for preventing the descent of other shells during its movement, mechanism for moving said shell receiver from the shell delivery device to the shell carrier, and a spring attached to said shell receiver for returning the same to its first position, substantially as described.

4. In a shell-placer for cartridge loading machines, the combination with the shell feeding tube or device, of a reciprocating shell receiver movable in fixed guides and provided with a horizontal lip or flange for preventing the descent of other shells during its movement, and a flange depending from the rear of said shell receiver for guiding the shells into the shell cases, and mechanism substantially as described for operating the same.

5. In a shell-placer for cartridge loading machines, the combination with the shell feeding tube or device, of a reciprocating shell receiver, and mechanism for moving the same forward to deliver a shell into the shell cases in the shell carrier and a spring for returning said shell placer to its normal position to receive another shell, substantially as described.

6. In a shell-placer for cartridge loading machines, the combination with a reciprocating shell receiver movable in fixed guides, of a cam-lever suitably connected thereto operated by the reciprocating cross-head of the machine, for giving said receiver a forward movement, and a spring for returning the same to its normal position, substantially as described.

7. In a shell placer for cartridge loading machines and supported by and connected thereto, the combination with a reciprocating shell-receiver movable in suitable guides, of a cam-lever pivoted to the machine at one end, and flexibly connected to said receiver at the other end for moving the same forward and a screw-threaded bolt provided with a spring and movable in a suitable raceway in a fixed bracket for returning said receiver to its normal position, substantially as described.

In testimony whereof I affix my signature in presence of two witnesses.

CHARLES S. HISEY.

Witnesses:
H. F. RICE,
JOSEPH D. WOOD.